Sept. 19, 1961      K. H. REISS      3,001,071

X-RAY FILM CASSETTE

Filed Oct. 22, 1956

Inventor:
Karl Hans Reiss.

United States Patent Office 3,001,071
Patented Sept. 19, 1961

3,001,071
X-RAY FILM CASSETTE
Karl Hans Reiss, Erlangen, Germany, assignor to Siemens-Reiniger-Werke Aktiengesellschaft, Erlangen, Germany
Filed Oct. 22, 1956, Ser. No. 617,564
Claims priority, application Germany Mar. 23, 1956
5 Claims. (Cl. 250—68)

This invention relates to an X-ray film cassette.

It is an object of the invention to provide an X-ray film cassette which—unlike the conventional metal film holders—is safe against bending or warping and—unlike the known film holders of plastic material—is safe against breaking in case of shock stresses, for instance when it is inadvertently dropped, while the wall of the film cassette facing the source of X-rays has a uniform high permeability for X-rays.

With this and further objects in view, according to the invention, the X-ray film cassette with the exception of its bottom wall, is made of a plastic material which is reinforced by suitable fibrous material, for example glass fibres which impart to the plastic material a higher strength against shocks and breakage stresses and prevent warping of the cassette, for example, in the presence of thermal stresses. Moreover, since the plastic material reinforced by fibres is highly elastic, the cassette is safe against warping.

If the bottom wall of the cassette disposed in front of the film, in the direction of the rays, would also be reinforced by fibrous material, the structure of the fibrous material would appear on the X-ray film. Therefore, according to the invention, this bottom wall of the cassette is made of a plastic material reinforced by layers of paper. A bottom wall produced in this manner, while not having the high mechanical strength as the fibre-reinforced parts of the cassette, weakens the X-rays uniformly and does not produce disturbing shadows on the film.

The foregoing and further objects, features and advantages of the invention will appear from the description of an embodiment which will be rendered below with reference to the accompanying drawing, in which FIG. 1 is a section through a press mold for producing a cassette according to the invention;

Similar reference numerals denote similar parts in the different views.

Figure 1:
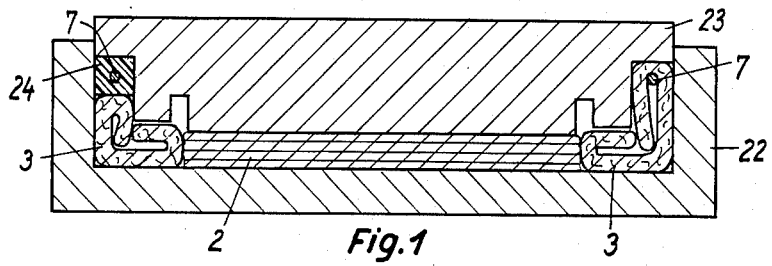

Glass fibre material impregnated with synthetic resin, for example, paper layers of sheet like or multilayered structure impregnated with synthetic resin are obtainable on the market. Glass fiber material impregnated with polyester resin is known under the trademark "Polyester-Prepreg." Such flexible material is placed into a press mold 22, FIG. 1, that is the material 2 reinforced by paper layers is placed at the bottom of the mold and the material 3 reinforced by glass fibres, more particularly glass fabric, is put into the border part of the mold. The last-mentioned material 3 is wrapped around a wire 7 which is intended to reinforce the structure of the cassette. The plastic material is compressed by the upper die 23 of the mold with simultaneous heating, to cause it to conform to the contours of the mold, is then hardened for a suitable period at a suitable temperature, for example, in case of polyester resin, for 10 minutes at a temperature of 120° C.

Figure 2:
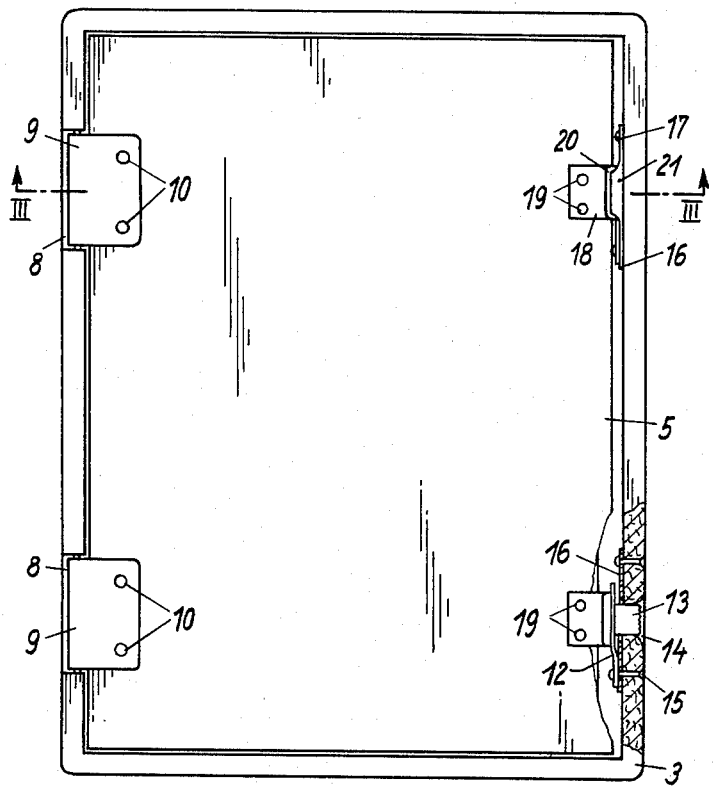
FIG. 2 is a plan view of a cassette having the invention applied thereto.
Figure 3:
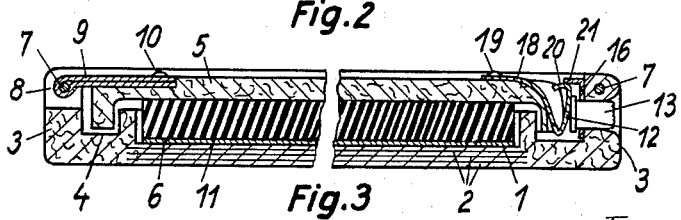
FIG. 3 is a somewhat enlarged cross sectional view through the cassette as seen when looking in the direction of the arrows along line III—III of FIG. 2.

At the points 8, FIGS. 2 and 3, the wire 7 is surrounded with rubber sleeves 24, before the compression, which rubber sleeves are removed after solidification of the plastic material, so as to provide sufficient space for the attachment of hinges 9 on which the cover 5 of the cassette is secured by means of rivets 10. The cover 5 is produced of plastic material reinforced by glass fibres, similar to the border of the bottom wall.

Provided on the inside of the cover 5 of the cassette is an elastic pad 11 which in a closed condition of the film holder presses the film 6 into a plane shape with respect to the bottom wall 1 thereof.

The film holder is held in closed condition by a button controlled mechanism comprising buttons 13 held by springs 12 and projecting through recesses 14 in the border part 3 extending from the bottom wall 2 of the film holder. Each of the springs 12 is secured to the border part 3 by a rivet 15. These rivets 15 moreover hold angle members 16 which are additionally secured to the border 3 by rivets 17. This closing mechanism cooperates with a curved spring 18 secured to the cover 5 of the film holder by rivets 19.

In closed condition of the cassette, the edge 20 of the spring 18 engages under the ledge 21 formed by the angle member 16, thus holding the cover 5 in position. When the button such as 13 is depressed, the spring such as 18 will be compressed, thus permitting the edge 20 thereof to slide past the ledge 21 of the angle member 16 so that the cassette can be opened.

The border 3 of the cassette is provided with a groove 4 to be engaged by the cover 5 in closed position thereof. A light barrier or lock is thus produced which prevents outside light reaching the film 6 inserted in the cassette.

As plastic materials for impregnation of the glass fibres and the paper layers are further suited, besides said polyester resin, phenolic formaldehyde resins and aethoxyline resins.

For the bottom of a film holder of 18 x 25 cm. size the following materials are, for example, needed:

300 g. of an ethoxyline resin of low viscosity, for example, as known under the trademark Araldit M;
27 g. dicyandiamide for solidification; and
3 g. black aniline dye (diamond black).

These materials are mixed together and then used to impregnate the glass fibres and the cellulose paper. 10–15 sheets of cellulose paper with a weight of surface of 0.26 g./dm.$^2$ are impregnated up to a weight of surface of 1.7 g./dm.$^2$, and 172 cm. glass fabric ribbon (0.3 mm. x 30 mm.) with a weight surface of 3 g./dm.$^2$ is impregnated up to a weight of surface of 12.5 g./dm.$^2$.

The impregnated materials are then put into the mold as described before. When the resin has assumed a sufficiently high viscosity due to the solidification substance, the mold is operated to effect compression of the material with simultaneous heating to a temperature of about 60–80° C., whereby excess resin is expelled and flows out of the mold. The resin is then hardened by applying a temperature of 80° C. for one hour.

Instead of glass fibres also natural fibres, like cotton, or semi-synthetic fibres, like rayon artificial silk, or whole synthetic fibres, like polyamide and nylon, may be used.

Changes may be made within the scope and spirit of the appended claims.

I claim:

1. An X-ray film cassette comprising a unitary molded structure including a bottom wall through which X-rays pass to an X-ray film to be disposed in said cassette for the purpose of making an X-ray exposure and also including side walls extending from said bottom wall and having laterally inwardly extending bottom border portions merging with said bottom wall, said side walls and the border portions thereof merging with said bottom wall being formed of synthetic material reinforced by fibrous material which impedes the passage of X-rays and the portion of the bottom wall extending inwardly from said border portions of said side walls being reinforced by material which favors the passage of X-rays, a cover made of synthetic material also reinforced by fibrous material which impedes the passage of X-rays, and means for hingedly connecting said cover with one of said side walls for opening and closing motion with respect to the remaining side walls.

2. A structure according to claim 1, comprising marginal extensions carried by said cover, said extensions entering in closed position of said cover into grooves formed in said side walls to exclude passage of outside light into the interior of said cassette.

3. A structure according to claim 1, wherein glass fibers constitute the reinforcing material which impedes the passage of X-rays and wherein paper layers constitute the material which favors the passage of X-rays.

4. A structure according to claim 1, comprising a wire embedded in said side walls, portions of said wire along one of the side walls being exposed, and hinge means carried by said cover for pivotal engagement with said exposed wire portions.

5. An X-ray film cassette comprising a unitary molded structure including a bottom wall through which X-rays pass to an X-ray film to be disposed in said cassette for the purpose of making an X-ray exposure and also including side walls extending from said bottom wall and having laterally inwardly extending bottom border portions merging with said bottom wall, said side walls and the border portions thereof merging with said bottom wall being formed by synthetic material reinforced by glass fibers and the portion of the bottom wall extending from said border portions of said side walls being reinforced by paper layers, a cover made of synthetic material also reinforced by glass fibers, a wire embedded in at least one of said side walls, portions of said wire being exposed, hinge means carried by said cover for pivotal engagement with said exposed wire portions to dispose said cover for opening and closing motion with respect to the remaining side walls, and marginal extensions carried by said cover, said extensions entering in closed position of said cover into grooves formed in said side walls to exclude passage of outside light into the interior of said cassette.

References Cited in the file of this patent

UNITED STATES PATENTS

| | | |
|---|---|---|
| 2,590,892 | Reuter | Apr. 1, 1952 |
| 2,679,009 | Lusebrink | May 18, 1954 |
| 2,698,991 | Mesick | Jan. 11, 1955 |